United States Patent
Smith

(10) Patent No.: US 10,331,004 B2
(45) Date of Patent: Jun. 25, 2019

(54) GRAPHIC MIRROR

(71) Applicant: Marketing Displays, Inc., Farmington Hills, MI (US)

(72) Inventor: Clay Smith, Bloomfield Hills, MI (US)

(73) Assignee: Marketing Displays, Inc., Farmington Hills, MI (US)

(*) Notice: Subject to any disclaimer, the term of this patent is extended or adjusted under 35 U.S.C. 154(b) by 88 days.

(21) Appl. No.: 15/464,884

(22) Filed: Mar. 21, 2017

(65) Prior Publication Data
US 2017/0277010 A1 Sep. 28, 2017

Related U.S. Application Data

(60) Provisional application No. 62/311,563, filed on Mar. 22, 2016.

(51) Int. Cl.
*G02B 26/00* (2006.01)
*G02F 1/01* (2006.01)
(Continued)

(52) U.S. Cl.
CPC ............ *G02F 1/167* (2013.01); *G02F 1/0105* (2013.01); *G02F 1/0121* (2013.01); *G09F 13/12* (2013.01);
(Continued)

(58) Field of Classification Search
CPC ............ G02F 1/167; G02F 2001/1678; G02F 2001/1672
(Continued)

(56) References Cited

U.S. PATENT DOCUMENTS

| 5,080,940 A | 1/1992 | Kugimiya |
| 6,420,975 B1 * | 7/2002 | DeLine ................ B60R 1/12 340/425.5 |

(Continued)

FOREIGN PATENT DOCUMENTS

| JP | 3687976 B2 | 8/2005 |
| WO | 02-27395 A1 | 4/2002 |
| WO | 2015-114865 A1 | 8/2015 |

OTHER PUBLICATIONS

International Search Report and Written Opinion of the International Searching Authority for PCT/US2017/023617, dated May 29, 2017.

*Primary Examiner* — William R Alexander
*Assistant Examiner* — Tamara Y. Washington
(74) *Attorney, Agent, or Firm* — Harness, Dickey & Pierce, P.L.C.

(57) ABSTRACT

A graphic display apparatus including a substrate including a first major surface and a second major surface, the substrate configured to transmit light when the graphic display apparatus is in a transmissive mode and reflect light when the graphic display apparatus is in a reflective mode; a reflective layer positioned on the first major surface of the substrate; a tint layer positioned on the second major surface; a diffuser layer including an image that is positioned on the tint layer such that the diffuser layer and the substrate sandwich the tint layer; and a light source located proximate the diffuser layer such that the light source and the diffuser layer sandwich the image, wherein, when the graphic display apparatus is in the transmissive mode, the light source illuminates the image such that the image is viewable from the first major surface of the substrate, and when the graphic display apparatus is in the reflective mode, the image is not illuminated by the light source and is not viewable from the first major surface of the substrate.

20 Claims, 8 Drawing Sheets

(51) Int. Cl.
  *G02F 1/167*    (2019.01)
  *G09F 13/12*    (2006.01)
  *G09F 23/00*    (2006.01)
  *G02F 1/1681*   (2019.01)

(52) U.S. Cl.
  CPC ............ *G09F 23/00* (2013.01); *G02F 1/1681* (2019.01); *G02F 2203/01* (2013.01); *G02F 2203/02* (2013.01)

(58) Field of Classification Search
  USPC ............ 359/290–296, 242, 245, 251–254, 359/265–267, 272, 273, 277, 315–317, 359/322
  See application file for complete search history.

(56) References Cited

U.S. PATENT DOCUMENTS

| | | | |
|---|---|---|---|
| 8,139,290 B2 | 3/2012 | Choi | |
| 2004/0051827 A1 | 3/2004 | Hinata et al. | |
| 2004/0100598 A1 | 5/2004 | Adachi et al. | |
| 2006/0242867 A1 | 11/2006 | Choi | |
| 2006/0260155 A1 | 11/2006 | Molleda Leon | |
| 2007/0097484 A1 | 5/2007 | Libretto et al. | |
| 2008/0151092 A1 | 6/2008 | Vilcovsky | |
| 2008/0297676 A1* | 12/2008 | Kimura | G02F 1/13624 349/39 |
| 2009/0002586 A1* | 1/2009 | Kimura | G02F 1/136213 349/39 |
| 2010/0144432 A1 | 6/2010 | Nittou | |
| 2011/0216405 A1 | 9/2011 | Choi | |
| 2012/0026434 A1 | 2/2012 | Chen | |
| 2014/0146289 A1 | 5/2014 | Biernath et al. | |
| 2014/0307039 A1* | 10/2014 | Tamoto | G02F 1/167 347/221 |
| 2014/0340430 A1* | 11/2014 | Telfer | G09G 3/344 345/690 |
| 2015/0146273 A1* | 5/2015 | Whitehead | G02F 1/167 359/222.1 |
| 2015/0277099 A1* | 10/2015 | Hong | G09G 3/346 345/520 |
| 2016/0026039 A1 | 1/2016 | Sakai et al. | |
| 2016/0077363 A1* | 3/2016 | Shiota | G02F 1/1323 349/61 |
| 2016/0077364 A1* | 3/2016 | Shiota | G02F 1/1323 349/61 |
| 2016/0091770 A1* | 3/2016 | Bouchard | G09G 3/2044 359/296 |
| 2016/0124284 A1* | 5/2016 | O'Keeffe | G02F 1/167 359/296 |
| 2016/0161770 A1* | 6/2016 | Joo | G02F 1/0102 359/241 |
| 2016/0170250 A1* | 6/2016 | Ghali | G02F 1/13338 359/296 |
| 2016/0187644 A1* | 6/2016 | Bhakta | G02B 26/0833 359/292 |
| 2016/0377950 A1* | 12/2016 | Zhang | G02F 1/167 359/296 |

\* cited by examiner

GRAPHIC MIRROR

CROSS-REFERENCE TO RELATED APPLICATIONS

This application claims the benefit of U.S. Provisional Application No. 62/311,563, filed on Mar. 22, 2016. The entire disclosure of the above application is incorporated herein by reference.

FIELD

The present disclosure relates to a two-way mirror that is configured to reflect an image in a first state, and to transmit an image in a second state.

BACKGROUND

This section provides background information related to the present disclosure which is not necessarily prior art.

Advertisements using a half-mirror (sometimes referred to as a transparent mirror, a two-way mirror, or a one-way mirror) have recently been developed. The half-mirror is a transparent material (e.g., glass, acrylic, polycarbonate, etc.) that is at least partially coated with a reflective material on a front- or rear-side thereof, and includes an image proximate the rear side thereof. The half-mirror reflects ambient light in the absence of light behind the half-mirror such that the half-mirror acts as a traditional fully reflective mirror. Conversely, when light from a light source illuminates the image located behind the half-mirror, the image is transmitted through the half-mirror and observed at the front side thereof. Challenges remain, however, in creating the ideal amount of transparency and reflectivity in the half-mirror to allow the illuminated image to show vibrantly when lit and completely disappear when not lit.

SUMMARY

This section provides a general summary of the disclosure, and is not a comprehensive disclosure of its full scope or all of its features.

The present disclosure provides a graphic display apparatus including a substrate having a first major surface and a second major surface, the substrate configured to transmit light when the graphic display apparatus is in a transmissive mode and reflect light when the graphic display apparatus is in a reflective mode; a reflective layer positioned on the first major surface of the substrate; a tint layer positioned on the second major surface; a diffuser layer including an image that is positioned on the tint layer such that the diffuser layer and the substrate sandwich the tint layer; and a light source located proximate the diffuser layer such that the light source and the diffuser layer sandwich the image, wherein, when the graphic display apparatus is in the transmissive mode, the light source illuminates the image such that the image is viewable from the first major surface of the substrate, and when the graphic display apparatus is in the reflective mode, the image is not illuminated by the light source and is not viewable from the first major surface of the substrate.

The present disclosure also provides a graphic display apparatus including a substrate having a first major surface and a second major surface, the substrate configured to transmit light when the graphic display apparatus is in a transmissive mode and reflect light when the graphic display apparatus is in a reflective mode; a reflective layer positioned on the first major surface of the substrate; an electrically conductive member positioned on the second major surface of the substrate, the electrically conductive member being transparent in the transmissive mode and opaque in the reflective mode; an image that is positioned on the electrically conductive member such that the image and the substrate sandwich the electrically conductive member; a light source located proximate the image for illuminating the image in the transmissive mode; and a voltage source configured to apply a voltage to at least the electrically conductive member, wherein, when the graphic display apparatus is in the transmissive mode, the light source illuminates the image and the voltage source provides the voltage to the electrically conductive member to make the electrically conductive member transparent such that the image is viewable from the first major surface of the substrate, and when the graphic display apparatus is in the reflective mode, the voltage source does not apply the voltage to the electrically conductive member such that the electrically conductive member is opaque and the image is not viewable from the first major surface of the substrate.

Lastly, the present disclosure provides a graphic display apparatus including a substrate having a first major surface and a second major surface, the substrate configured to transmit light when the graphic display apparatus is in a transmissive mode and reflect light when the graphic display apparatus is in a reflective mode; a reflective layer positioned on the first major surface of the substrate; an electrophoretic layer positioned on the second major surface of the substrate, the electrophoretic layer including a plurality of particles that can display an image in the transmissive mode and make the electrophoretic layer opaque in the reflective mode; and a light source located proximate the electrophoretic layer for illuminating the image in the transmissive mode; wherein, when the graphic display apparatus is in the transmissive mode, the light source illuminates the image generated by the electrophoretic layer; and when the graphic display apparatus is in the reflective mode, the electrophoretic layer is opaque such that only images reflected by the reflective layer are viewable at the first major surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
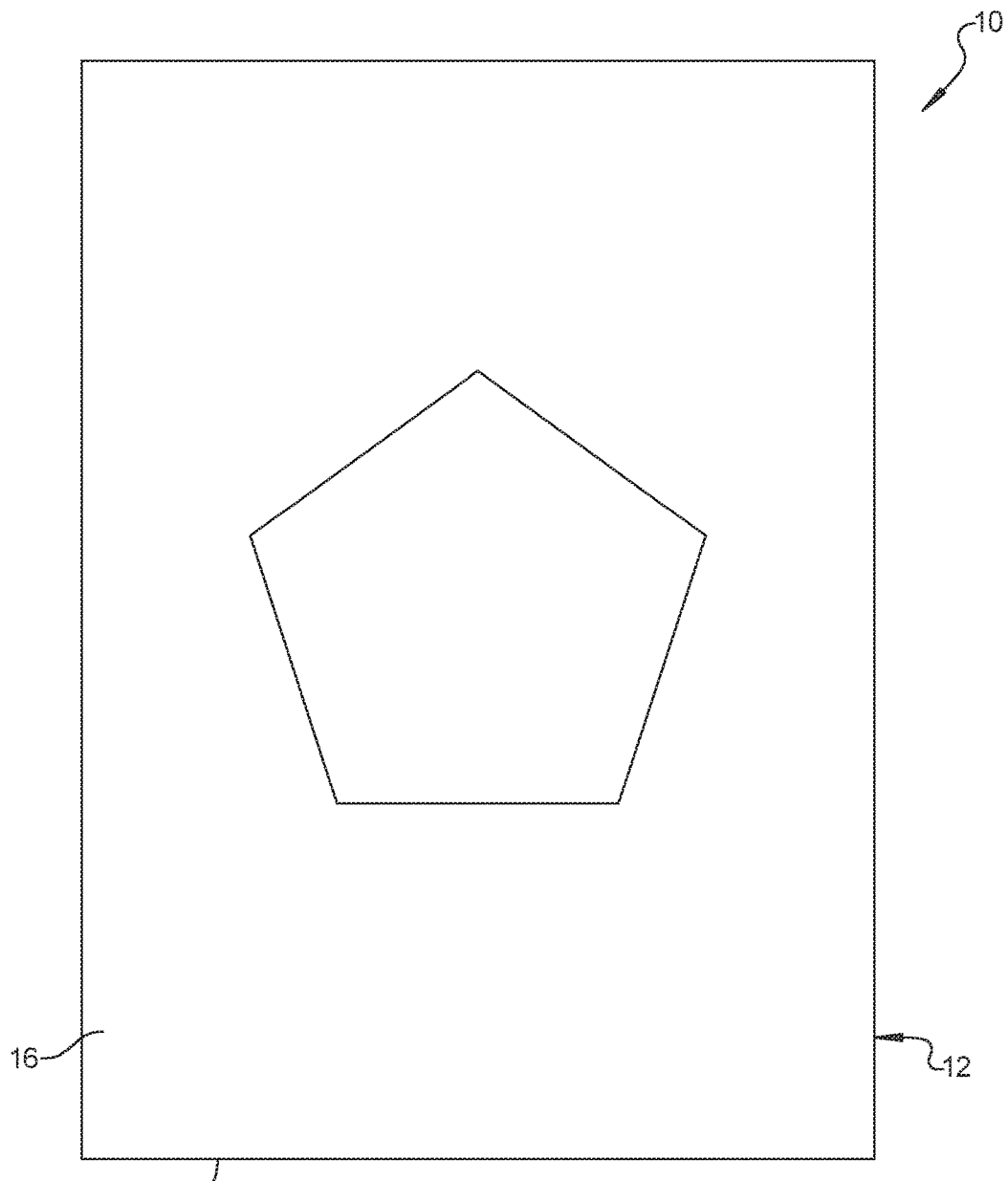
FIG. 1 illustrates a graphic display apparatus in a transmissive mode according to a first principle of the present disclosure.
Figure 2:
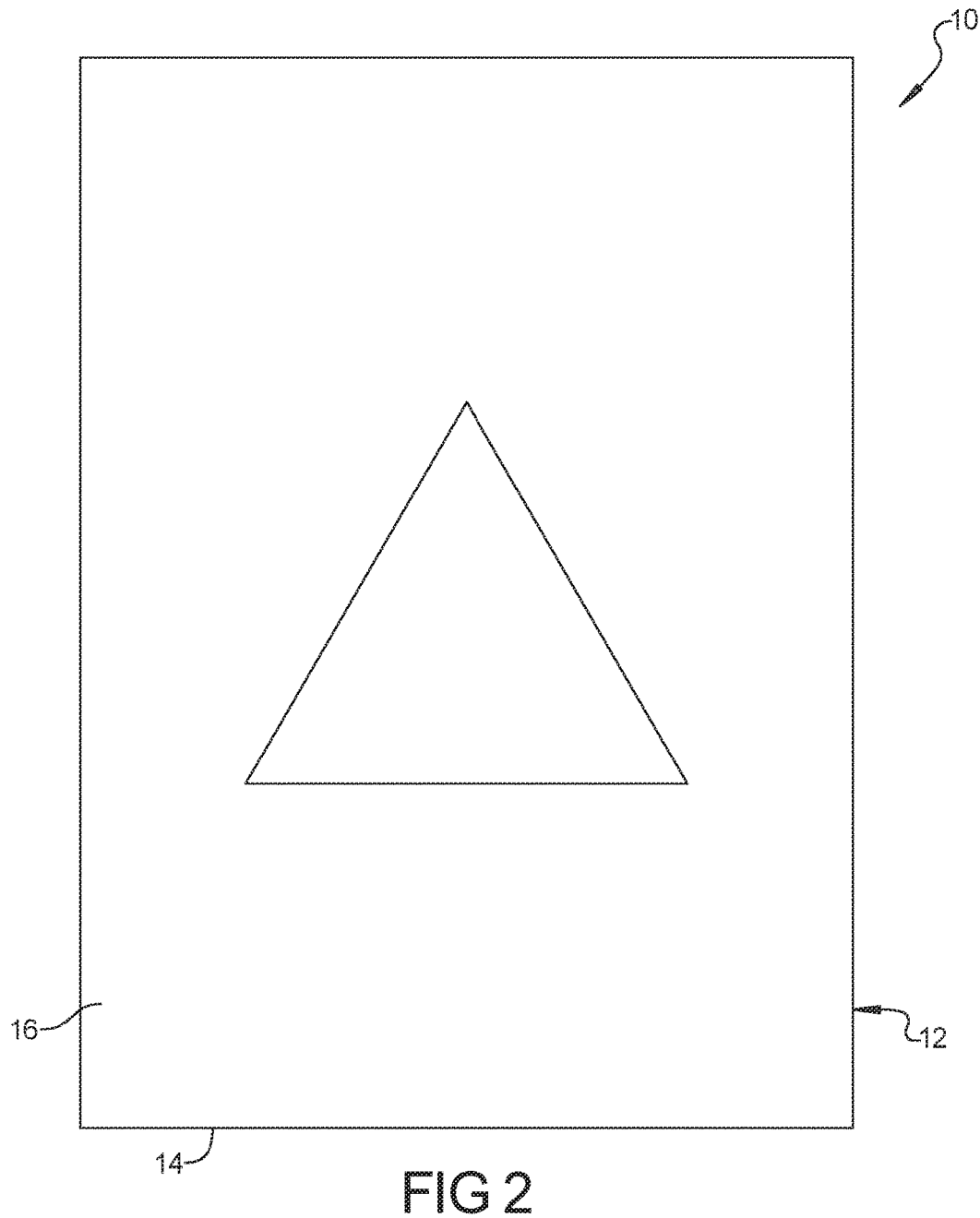
FIG. 2 illustrates the graphic display apparatus in a reflective mode according to the first principle of the present disclosure.
Figure 3:
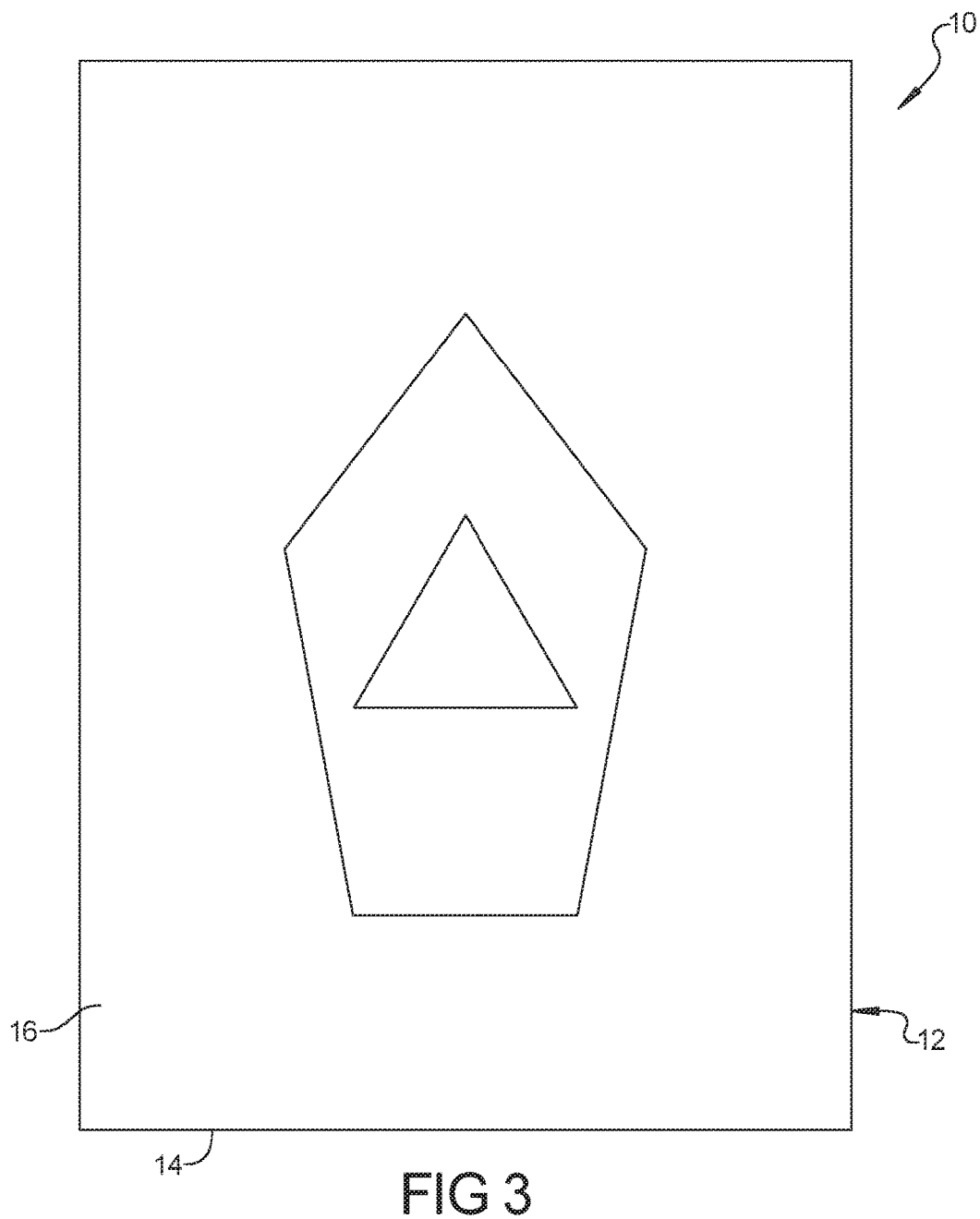
FIG. 3 illustrates the graphic display apparatus during a transition between the transmissive mode and the reflective mode according to the first principle of the present disclosure.

Referring to FIGS. 1-6, there is illustrated a graphic display apparatus 10 according to the present disclosure. As best shown in FIGS. 1 and 2, display apparatus 10 includes a mirror device 12 that is configured to operate in a first or transmissive mode (see, e.g., FIG. 1), and to operate in a second or reflective mode (see, e.g., FIG. 2). A transition between the transmissive mode (FIG. 1) and the reflective mode (FIG. 2) is illustrated in FIG. 3, where it can be seen that an image (in this case, a triangle) located behind mirror device 12 is being partially transmitted by mirror device 12, and an image (in this case, a pentagon) located in front of mirror device 12 is being partially reflected by mirror device 12.

Figure 4:
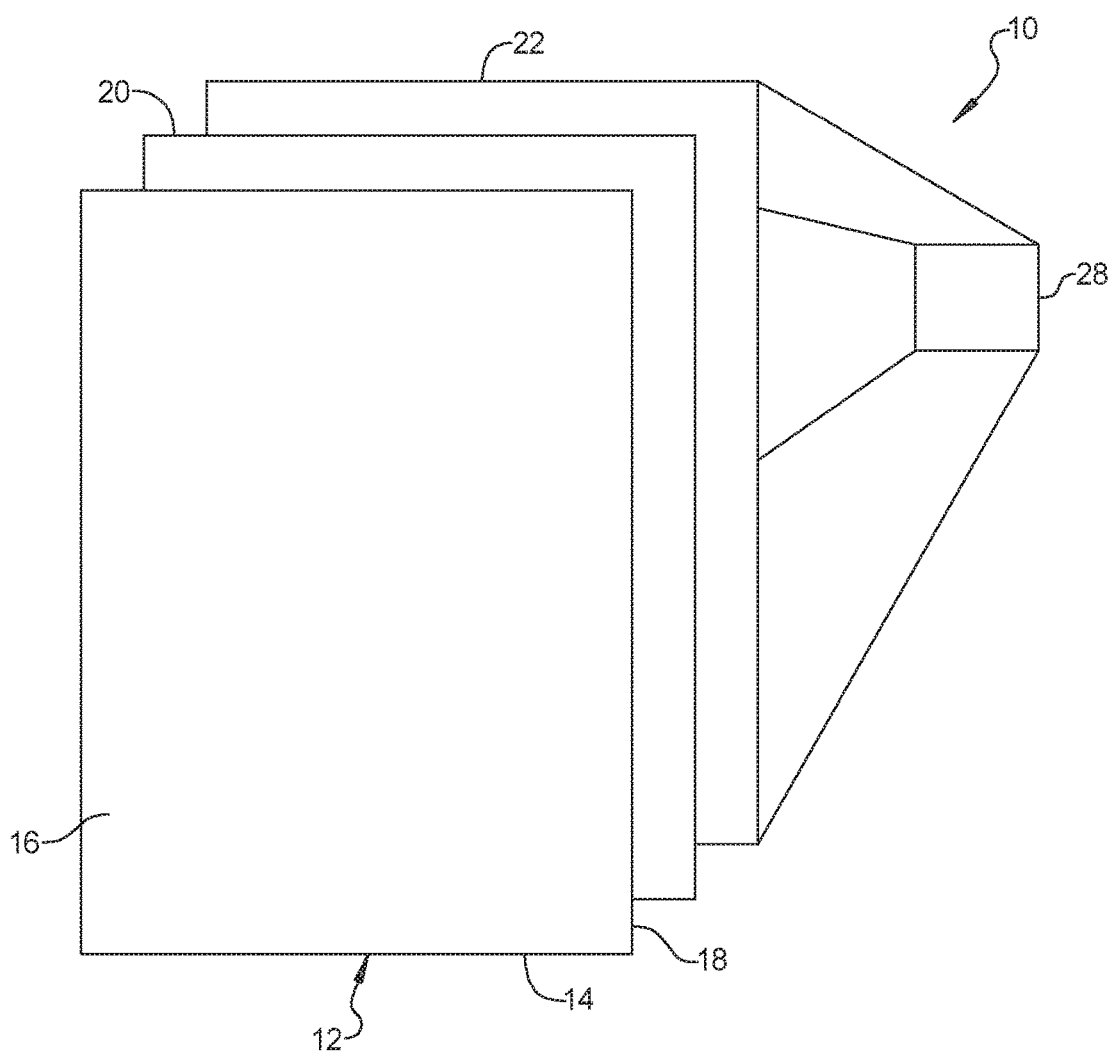
FIG. 4 is a schematic exploded perspective view of the graphic display apparatus illustrated in FIG. 1.
Figure 5:
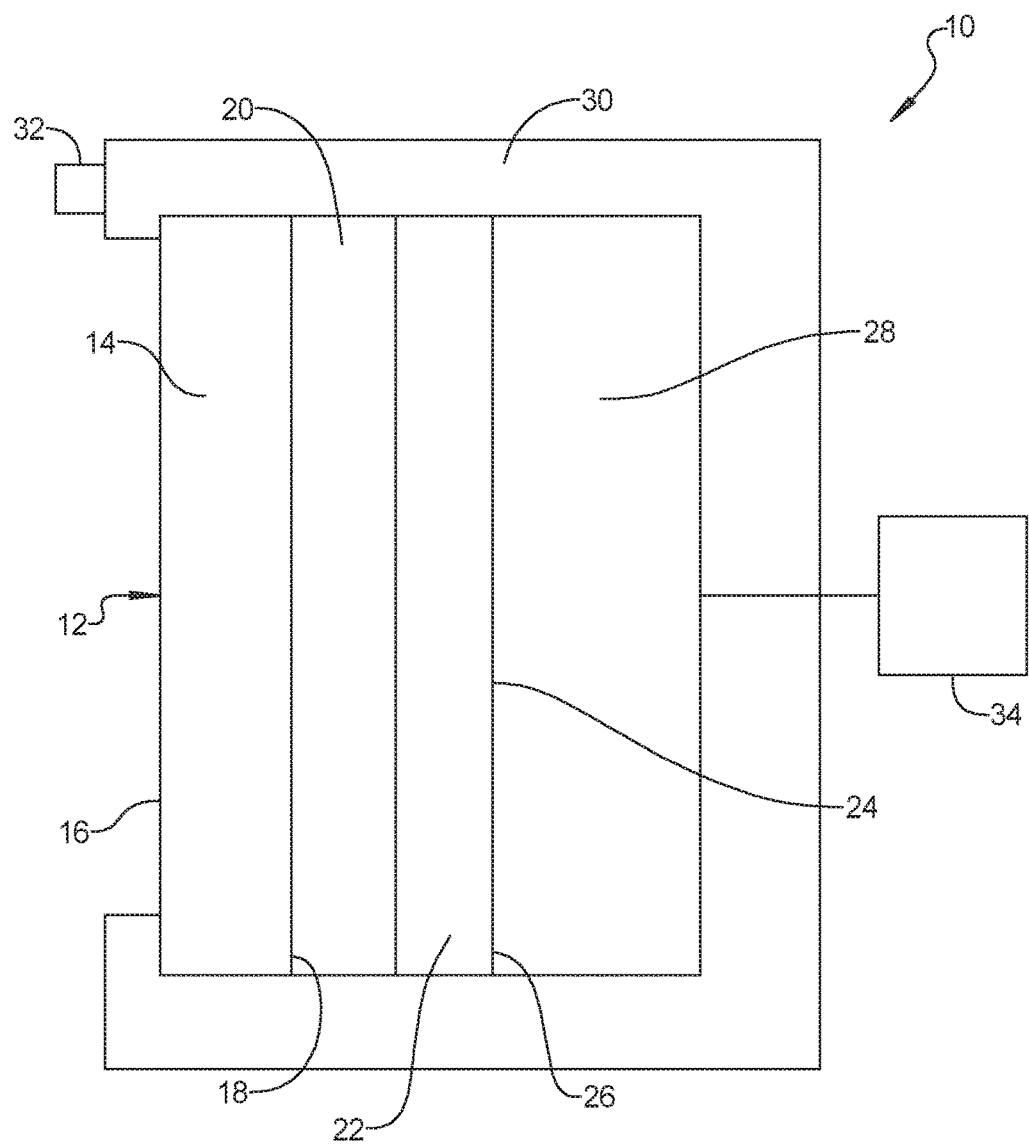
FIG. 5 is a schematic cross-sectional view of the graphic display apparatus illustrated in FIG. 1.

Mirror device 12 is a transflective mirror that, as noted above, can both transmit and reflect light. In other words, mirror device 12 is a so-called half-mirror. As best shown in FIGS. 4 and 5, mirror device 12 includes a plate-shaped transparent substrate 14 that may be formed of a transparent material such as a glass, acrylic, or polycarbonate material. It should be understood that these materials are only exemplary, and the present disclosure should not be limited thereto. That is, other transparent substrate materials can be used without departing from the scope of the present disclosure.

Substrate 14 of mirror device 12 has a reflective coating applied in a very thin and sparse layer. In this regard, a reflective material such as silver, aluminum, chromium or the like coats the substrate 14 so sparsely that only about half the molecules needed to make the substrate 14 an opaque mirror are applied. At the molecular level, there are reflective molecules provided to the substrate 14 in a uniform film, but only half of the substrate 14 is covered to yield a "half-mirror." Because only half of the substrate 14 is coated with the reflective material, the substrate 14 will reflect about half the light that strikes its surface, while letting the other half pass therethrough. According to the present disclosure, it is preferable that substrate 14 is about sixty percent transparent and about forty percent reflective. It should be understood, however, that other percentages may be used (e.g., 50/50, 40/60, etc.) without departing from the scope of the present disclosure.

Substrate 14 includes a visible or front surface 16 (i.e., the surface coated with the reflective material), and a non-visible or rear surface 18. The above-referenced reflective coating may be formed on either the front surface 16 or the rear surface 18 without departing from the scope of the present disclosure. In addition, rear surface 18 is preferably coated with a tint layer 20. Tint layer 20 may be provided directly to rear surface 18 of substrate 14, or may be present in graphic display device 10 as a layer that is separate and apart from substrate 14.

Tint layer 20 is configured to darken substrate 14 in the range from about ten percent to 40 percent. Preferably, tint layer 20 darkens substrate 14 about twenty percent. An exemplary tint layer 20 is one that may be used in residential or commercial window applications for ultraviolet and infrared protection. Alternatively, if tint layer 20 is separate and apart from substrate 14, tint layer 20 may be a 3 mm thick extruded acrylic plexiglass material that is tinted grey (MC Grey 2064). Other tint layers, however, including those having a thickness greater or lesser thicknesses than 3 mm, and those that are tinted to a greater or lesser extent than twenty percent may be used without departing from the scope of the present disclosure.

Graphic display apparatus 10 may also include a diffuser layer 22. Diffuser layer 22 may be formed from a material such as polyester, and is configured to spread out or scatter light in some manner, to give soft light and prevent hot spots. An exemplary diffuser layer is a Duratrans diffuser available from Eastman Kodak. Diffuser layer 22 also includes an image 24. Image 24 is located on a rear surface 26 of diffuser layer 22 (i.e., a surface of diffuser layer 22 that is opposite to tint layer 20). Image 24 is visible when mirror device 12 is operating in the transmissive mode (FIG. 1), and not visible when mirror device 12 is operating in the reflective mode (FIG. 2). Because image 24 is located on rear surface 26 of diffuser layer 22, it may be necessary to invert (e.g., use the mirror image of) any writing or characters that are to be displayed in the transmissive mode of mirror device 12. Image 24 may be provided to diffuser layer 22 in any manner known to one skilled in the art including ink jet printing, or any other type of printing method.

To illuminate image 24 when graphic display apparatus 10 is in the transmissive mode, graphic display apparatus 10 includes a light source 28. Light source 28 may be any type of light source known to one skilled in the art. Exemplary light sources 28 include light-emitting diodes (LEDs), electroluminescent panels (ELPs), cold cathode fluorescent lamps (CCFLs), hot cathode fluorescent lamps (HCFLs), external fluorescent lamps (EEFLs), and incandescent lightbulbs. These light sources 28 may be used with or without a light guide (not shown). As noted above, light source 28 is used when graphic display apparatus 10 is to be used in the transmissive mode, and is not used in the reflective mode.

Figure 6:
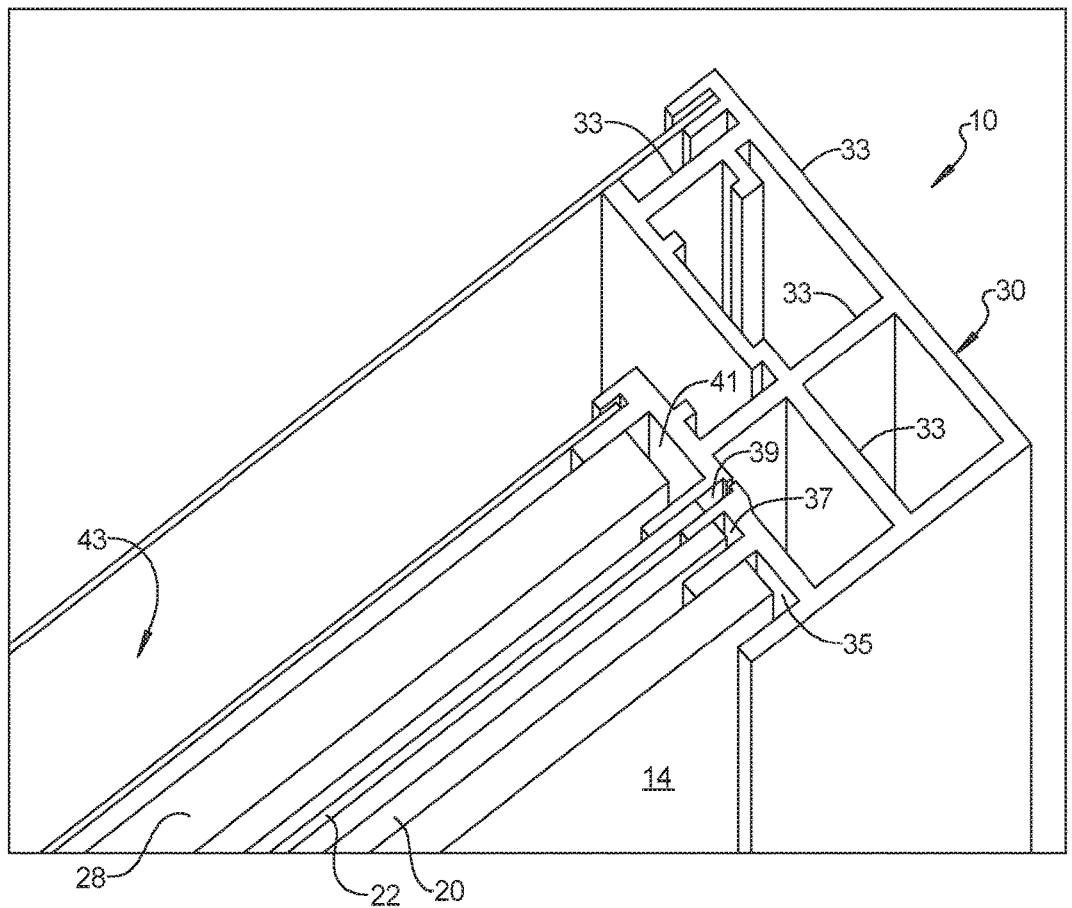
FIG. 6 is a perspective cross-sectional view of an example graphic display apparatus.

As best shown in FIGS. 5 and 6, graphic display apparatus 10 may include a frame or housing 30 that encases each of the substrate 14, tint layer 20, diffuser layer 22 including image 24, and light source 28. Housing 30, as best shown in FIG. 6, may include a plurality of structural members 33 that provide housing 30 with rigidity, and define a plurality of slots 35, 37, 39, and 41 for receipt and support of substrate 14 (at slot 35), tilt layer 20 (at slot 37), diffuser layer 22 including image 24 (at slot 39), and light source 28 (at slot 41). In this manner, the various elements of graphic display apparatus 10 can be easily removed and serviced, if required. In addition, such a configuration allows for different images 24 to be used, as desired. Although not shown in FIG. 6, a cavity 43 of housing 30 can house various electronics of display apparatus 10.

For example, housing 30 may include a sensor device 32 that detects movement or changes in ambient light proximate the front surface 16 of substrate 14. In addition, a controller 34 may be in communication with sensor device 32 and light source 28. If during transmissive display a change in movement or ambient light is detected by sensor device 32 and communicated to controller 34, controller 34 may then instruct light source 28 to turn off such that graphic display apparatus 10 may transition from transmissive display to reflective display.

For example, if graphic display apparatus 10 is in a transmissive mode (FIG. 1) and sensor device 32 detects movement at a location proximate front surface 16 of substrate 14, the graphic display apparatus 10 may transition to the reflective mode. Such a configuration is useful at, for example, a clothing store where the transmissive mode can be used for advertising purposes and the reflective mode can be used to allow a store patron to view his or herself when trying on clothing he or she is interested in purchasing. In this regard, movement of the patron will be detected by sensor device 32, and controller 34 will then instruct light source 28 to turn off so that graphic display apparatus 10 will transition to the reflective mode.

Controller 34 may be used to control the amount of time that is necessary to transition between the transmissive mode and the reflective mode, or vice versa. In this regard, the transition between transmissive mode and reflective mode can be immediate (i.e., less than one second), or may take place more slowly (i.e., in a range of three to ten seconds). Other transition intervals, however, are also contemplated.

According to the present disclosure, the graphic display apparatus 10 includes a tint layer 20, and the image 24 is located between the diffuser layer 22 and the light source 28. With such an arrangement, the image 24 is more easily hidden during the reflective mode. That is, the use of the tint layer 20 and the diffuser layer 22 between the image 24 and the substrate 14 darkens the image 24 when the graphic display apparatus 10 is in the reflective mode such that image 24 is not viewable. Further, such a configuration does not appreciably darken the image during illumination of the image 24 with light source 28 during the transmissive mode.

Figure 7:
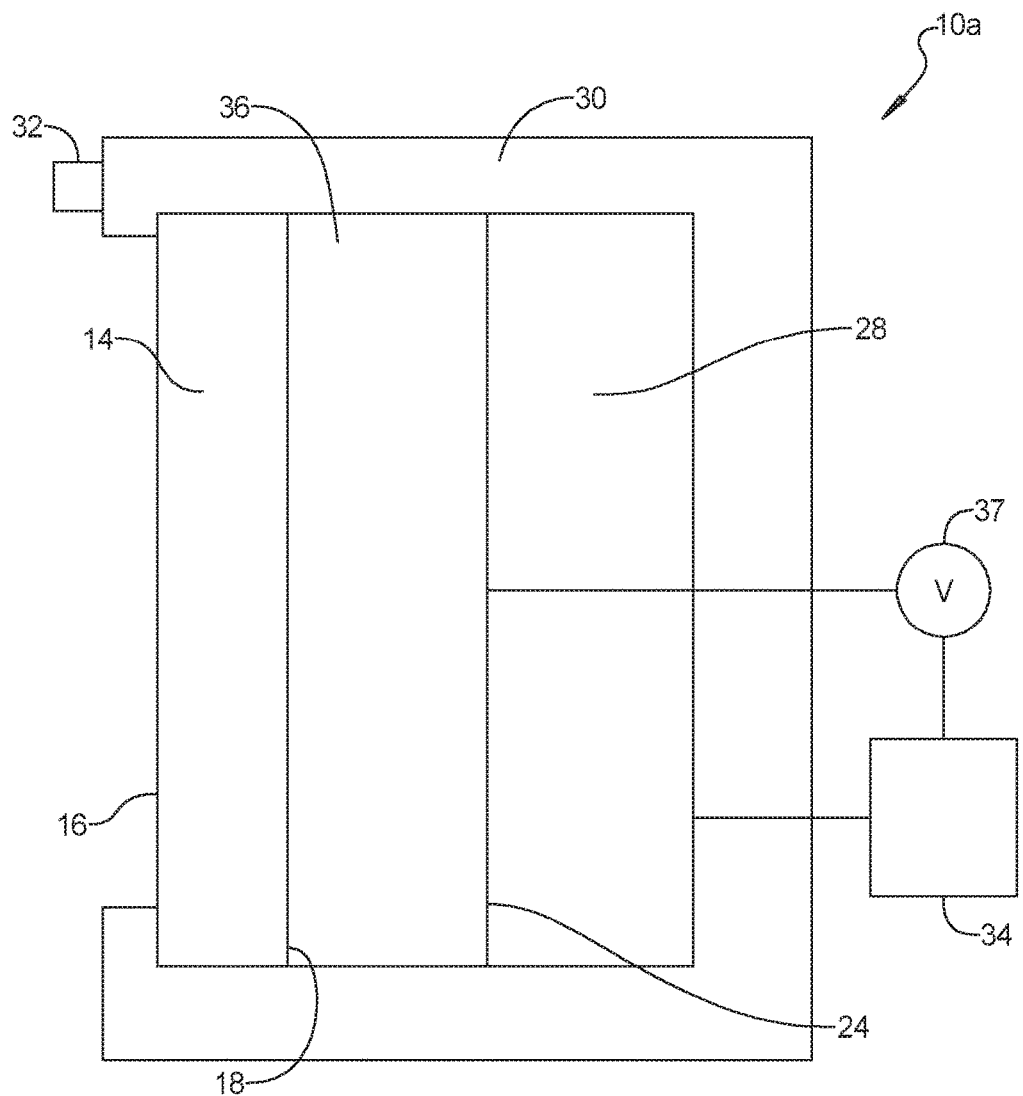
FIG. 7 is a schematic cross-sectional view of a graphic display apparatus according to second principle of the present disclosure.

Now referring to FIG. 7, a second exemplary embodiment according to the present disclosure will be described. FIG. 7 illustrates a graphic display apparatus 10a that includes a substrate 14 having a reflective coating that is the same as that noted above. That is, substrate 14 is a so-called half-mirror having a reflective coating applied in a very thin and sparse layer such that substrate 14 can transmit light from a light source 28 located behind substrate 14, and reflect light incident on the front surface 16. In lieu of tint layer 20 and diffuser layer 22, graphic display device 10a includes an electrically conductive member 36. Electrically conductive member 36 may be coated onto rear surface 18 of substrate 14, or may be separate and apart from substrate 14. Regardless, electrically conductive member 36 is configured to be either transparent or opaque when provided with an electric current or voltage by voltage source 37. That is, electrically conductive member 36 can switch between a transparent mode and an opaque mode when applied an electric current or voltage by voltage source 37. Thus, if graphic display apparatus 10a is to operate in the transmissive mode and electrically conductive member 36 is opaque, an electric current or voltage is applied to electrically conductive member 36 to switch the electrically conductive member to the transparent mode. Then, if graphic display apparatus 10a is to operate in the reflective mode, the electric current or voltage can again be applied to electrically conductive member 36 to switch the electrically conductive member 36 to the opaque mode. It is important to note that the electric current or voltage applied to the electrically conductive member 36 is not required to be constant to maintain either the transparent mode or opaque mode. Rather, application of the electric current or voltage will switch the electrically conductive member 36 from one mode to the other. Exemplary electrically conductive members 36 are available from Smart Tint®.

An image 24 may be located on a side of electrically conductive member 36 that is opposite to substrate 14. Image 24 may be provided to electrically conductive member 24 in any manner known to one skilled in the art including ink jet printing, or any other type of printing method. Lastly, graphic display apparatus 10a includes a light source 28, housing 30, sensor device 32, and controller 34, wherein controller 34 communicates with electrically conductive member 36 via voltage source 37 in addition to sensor device 32 and light source 28.

To operate graphic display apparatus 10a in the transmissive mode, controller 34 instructs light source 28 to illuminate and instructs that a current be provided to electrically conductive member 36 by voltage source 37. Because a current is applied to electrically conductive member 36, electrically conductive member 36 will be transparent. Thus, the illuminated image 24 can be transmitted through electrically conductive member 36 and substrate 14 to be viewed at the front surface 16 of substrate 14.

To operate graphic display apparatus 10a in the reflective mode, controller 34 instructs light source 28 to turn off and instructs that current not be provided to electrically conductive member 36. Because no current is being applied to electrically conductive member 36, electrically conductive member 36 will be opaque and hide image 24 from being viewed during the reflective mode.

Figure 8:
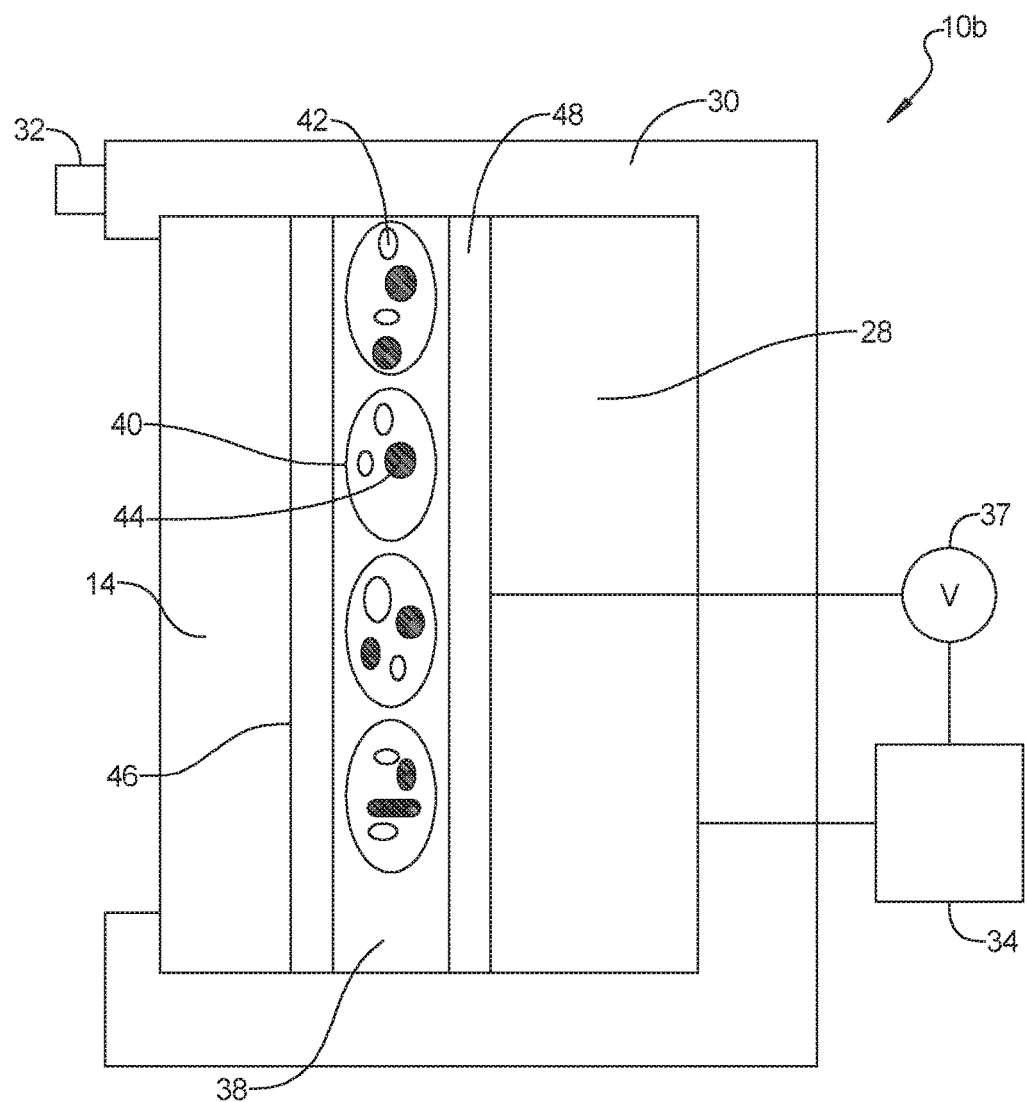
FIG. 8 is a schematic cross-sectional view of a graphic display apparatus according to a third principle of the present disclosure.

Now referring to FIG. 8, a third exemplary embodiment according to the present disclosure will be described. FIG. 8 illustrates a graphic display apparatus 10b that includes a substrate 14 having a reflective coating that is the same as that noted above. That is, substrate 14 is a so-called half-mirror having a reflective coating applied in a very thin and sparse layer such that substrate 14 can transmit light from a light source 28 located behind substrate 14, and reflect light incident on the front surface 16. In lieu of tint layer 20 and diffuser layer 22, or in lieu of electrically conductive member 36, graphic display device 10b includes an electrophoretic layer 38. Electrophoretic layer 38 may be laminated onto rear surface 18 of substrate 14, or may be separate and apart from substrate 14. Regardless, electrophoretic layer 38 is configured to display an image when provided with a voltage, and configured to be opaque when not provided with a voltage. Exemplary electrophoretic layers 38 are available from E Ink Corporation. Behind electrophoretic layer 38 may be a light source 28.

Electrophoretic layer 38 may include a plurality of microcapsules 40 that each include a plurality of negatively- and positively-charged particles 42 and 44. The plurality of microcapsules 40 are disposed between a pair of electrodes 46 and 48 that, when applied with a voltage, will either attract or repel the charged particles 42 and 44. In this manner, the electrophoretic layer 38 can be used to display an image, or be caused to be opaque. In this regard, the particles can be either white particles 42 or colored particles 44, with the white particles 42 causing the layer 38 to be opaque, and the colored particles 44 being used to display an image. Regardless, in a transmissive mode of the graphic display apparatus 10b, the image produced by electrophoretic layer 38 may be illuminated by light source 28 and transmitted through substrate 14. In contrast, in a reflective mode of the graphic display apparatus 10b, the electrophoretic layer 38 may be made opaque such that substrate 14 only reflects incident light.

Graphic display apparatus 10b may also include the sensor device 32 and controller 34, with controller 34 being in communication with sensor device 32, light source 28, and electrophoretic layer 38. In the transmissive mode, controller 34 may instruct electrophoretic layer 38 to display an image by instructing that the appropriate voltage from voltage source 37 be applied to electrodes 46 and 48 to attract the colored particles 44 toward substrate 14. In addition, controller 34 may instruct light source 28 to illuminate the image generated by electrophoretic layer 38. In the reflective mode, controller 34 may instruct electrophoretic layer 38 to be opaque by instructing that the appropriate voltage from voltage source 37 be applied to electrodes 46 and 48 to attract white particles 42 toward substrate. In addition, controller 34 will instruct light source 28 to turn off. Because electrophoretic layer 38 will be opaque, substrate 14 will only reflect incident light.

Lastly, it should be understood that housing 30 may include a two-piece configuration where a front portion of the housing 30 including substrate 14 is hingedly connected to a rear portion such that the front portion may open like a door relative to the rear portion of the housing 30, which includes at least light source 28 and image 24. In such a configuration, it is contemplated that image 24 is removable such that different images 24 may be used periodically during use of the graphic display apparatuses 10, 10a, and 10b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A graphic display apparatus, comprising:
   a substrate including a first major surface and an opposing second major surface, the substrate configured to transmit light when the graphic display apparatus is in a transmissive mode and reflect light when the graphic display apparatus is in a reflective mode;
   a reflective layer positioned on the first major surface of the substrate;
   a tint layer positioned on the second major surface;
   a diffuser layer including an image positioned adjacent the tint layer such that the diffuser layer and the substrate sandwich the tint layer; and
   a light source located proximate the diffuser layer such that the light source and the diffuser layer sandwich the image,
   wherein, in the transmissive mode, the light source illuminates the image such that the image is viewable from the first major surface of the substrate, and
   in the reflective mode, the image is not illuminated by the light source and is not viewable from the first major surface of the substrate.

2. The graphic display apparatus according to claim 1, wherein the tint layer is configured to prevent the image from being viewable when the graphic display apparatus is in the reflective mode.

3. The graphic display device according to claim 2, wherein the tint layer is configured to darken the substrate about 20 percent.

4. The graphic display apparatus according to claim 1, further comprising a sensor device configured to detect a condition proximate the substrate.

5. The graphic display apparatus according to claim 4, wherein the condition is movement proximate the substrate, and upon detection of the movement, the graphic display apparatus is switched from the transmissive mode to the reflective mode.

6. The graphic display apparatus according to claim 1, wherein the light source is one of a light-emitting diode (LED), electroluminescent panels (ELP), cold cathode fluorescent lamp (CCFL), hot cathode fluorescent lamp (HCFL), external fluorescent lamp (EEFL), and an incandescent light bulb.

7. The graphic display apparatus according to claim 1, wherein the substrate is formed from one of glass, acrylic, and polycarbonate.

8. A graphic display apparatus, comprising:
   a substrate including a first major surface and an opposing second major surface, the substrate configured to transmit light when the graphic display apparatus is in a transmissive mode and reflect light when the graphic display apparatus is in a reflective mode;
   a reflective layer positioned on the first major surface of the substrate;
   an electrically conductive member positioned on the second major surface of the substrate, the electrically conductive member being transparent when the graphic display apparatus is in the transmissive mode and opaque when the graphic display apparatus is in the reflective mode;
   an image that is positioned on the electrically conductive member such that the image and the substrate sandwich the electrically conductive member;
   a light source located proximate the image for illuminating the image in the transmissive mode; and
   a voltage source configured to apply a voltage to at least the electrically conductive member,
   wherein, in the transmissive mode, the light source illuminates the image and the voltage source provides the voltage to the electrically conductive member to make the electrically conductive member transparent such that the image is viewable from the first major surface of the substrate, and
   in the reflective mode, the voltage source provides the voltage to the electrically conductive member such that the electrically conductive member is opaque and the image is not viewable from the first major surface of the substrate.

9. The graphic display apparatus according to claim 8, further comprising a sensor device configured to detect a condition proximate the substrate.

10. The graphic display apparatus according to claim 9, wherein the condition is movement proximate the substrate, and upon detection of the movement, the graphic display apparatus is switched from the transmissive mode to the reflective mode.

11. The graphic display apparatus according to claim 8, wherein the light source is one of a light-emitting diode (LED), electroluminescent panels (ELP), cold cathode fluorescent lamp (CCFL), hot cathode fluorescent lamp (HCFL), external fluorescent lamp (EEFL), and an incandescent light bulb.

12. The graphic display apparatus according to claim 8, wherein the substrate is formed from one of glass, acrylic, and polycarbonate.

13. A graphic display apparatus, comprising:
a substrate including a first major surface and an opposing second major surface, the substrate configured to transmit light when the graphic display apparatus is in a transmissive mode and reflect light when the graphic display apparatus is in a reflective mode;
a reflective layer positioned on the first major surface of the substrate;
an electrophoretic layer positioned on the second major surface of the substrate, the electrophoretic layer including a plurality of particles that can display an image when the graphic display apparatus is in the transmissive mode and make the electrophoretic layer opaque when the graphic display apparatus is in the reflective mode; and
a light source located proximate the electrophoretic layer for illuminating the image when the graphic display apparatus is in the transmissive mode;
wherein, when the graphic display apparatus is in the transmissive mode, the light source illuminates the image generated by the electrophoretic layer; and
when the graphic display apparatus is in the reflective mode, the electrophoretic layer is opaque such that only images reflected by the reflective layer are viewable at the first major surface.

14. The graphic display apparatus according to claim 13, further comprising a sensor device configured to detect a condition proximate the substrate.

15. The graphic display apparatus according to claim 14, wherein the condition is movement proximate the substrate, and upon detection of the movement, the graphic display apparatus is switched from the transmissive mode to the reflective mode.

16. The graphic display apparatus according to claim 13, wherein the light source is one of a light-emitting diode (LED), electroluminescent panels (ELP), cold cathode fluorescent lamp (CCFL), hot cathode fluorescent lamp (HCFL), external fluorescent lamp (EEFL), and an incandescent light bulb.

17. The graphic display apparatus according to claim 13, wherein the substrate is formed from one of glass, acrylic, and polycarbonate.

18. The graphic display apparatus according to claim 13, wherein the plurality of particles are present in a plurality of microcapsules.

19. The graphic display device according to claim 13, wherein the electrophoretic layer includes a pair of electrodes that, upon application of a voltage to the electrodes, either attract or repel the plurality of particles.

20. The graphic display device according to claim 19, wherein the plurality of particles include white particle and colored particles.

* * * * *